United States Patent [19]
Miwa
[11] 4,030,408
[45] June 21, 1977

[54] THERMAL PRINTER HEAD

[75] Inventor: Takeshi Miwa, Kyota, Japan
[73] Assignee: Juichiro Ozawa, Kyoto, Japan

[22] Filed: Dec. 19, 1975
[21] Appl. No.: 642,354
[30] Foreign Application Priority Data
Jan. 21, 1975 Japan ............................ 50-009449
Nov. 10, 1975 Japan ............................ 50-153397
[52] U.S. Cl. ................................ 101/1; 346/76 R; 219/216; 197/1 R
[51] Int. Cl.[2] ........................................ G02B 7/06
[58] Field of Search .................... 101/1, 27, 93.04; 197/1 R; 219/216, 539, 541, 544; 346/76 R

[56] References Cited

UNITED STATES PATENTS

| | | | |
|---|---|---|---|
| 3,312,979 | 4/1967 | Della Torre et al. | 197/1 R X |
| 3,409,902 | 11/1968 | Merryman | 219/216 X |
| 3,453,647 | 7/1969 | Bernstein et al. | 346/76 R |
| 3,483,356 | 12/1969 | Kalt | 219/216 |
| 3,567,904 | 3/1971 | Carlsen et al. | 346/76 R X |
| 3,599,228 | 8/1971 | Coco et al. | 346/76 R |
| 3,609,294 | 9/1971 | Cody et al. | 219/216 |
| 3,726,212 | 4/1973 | Combs | 346/76 R |
| 3,777,116 | 12/1973 | Brescia et al. | 346/76 R X |

*Primary Examiner*—Edward M. Coven
*Attorney, Agent, or Firm*—Wenderoth, Lind & Ponack

[57] ABSTRACT

A thermal printer head has an insulator base with a plurality of linear recesses in the surface thereof, and heat generator elements embedded within the recesses in such a way that the areas of the surface of the base between the recesses are adapted to contact heat sensitive paper during a printing operation, so that the heat generator elements are protected against wear. The base can be a flat plate or a cylinder, and can have rear resistive films in the recesses over the heat generator elements.

3 Claims, 18 Drawing Figures

Fig. 8
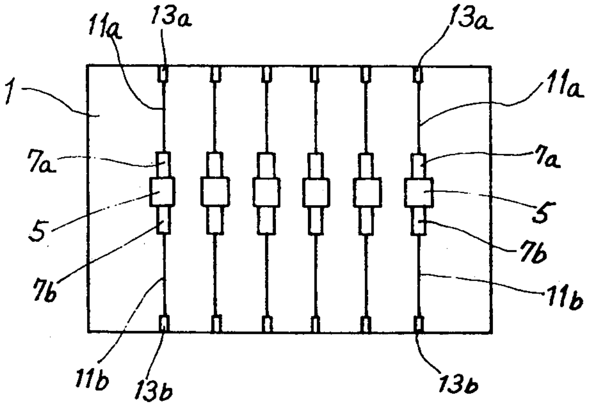
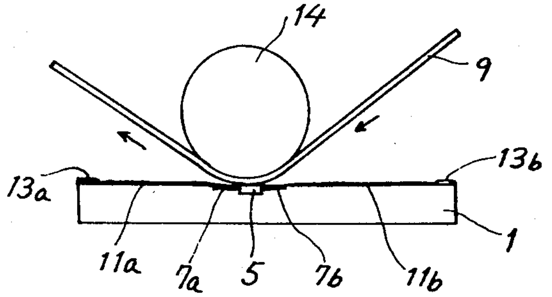
Fig. 9
Fig. 10
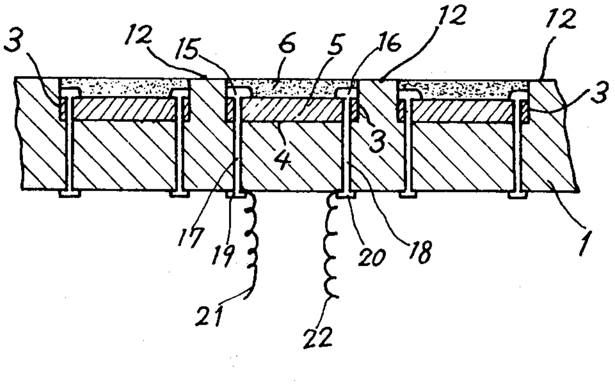

THERMAL PRINTER HEAD

This invention relates to a thermal printer head having an increased life, which is adapted to apply a precise thermal pattern onto a heat sensitive paper for developing colored displays on areas which have been exposed to a predetermined amount of heat, whereby characters, or figures or patterns in colors can be conveniently produced in a simple manner.

Conventionally there are generally used thermal printer heads, in which resistor film elements prepared by vacuum evaporation, heat generator elements in the form of a thicker resistance film prepared by a screen printing process or resistor elements prepared from crystal semiconductor on which a selective dispersion process has been performed (these resistor elements will be referred to as heat generator elements hereinafter) are arranged in rows or in a matrix, and then by utilizing Joule heat from a pulsed current which is caused to selectively flow through said elements, patterns of characters or of figures are caused to appear on a heat sensitive paper. In such an arrangement, because the heat sensitive paper is shifted while being contiguous to the printer head from a roll of paper, there will arise a primary problem that the printer head will be worn and the heat generator elements will deteriorate due to the friction between the heat generator elements and the heat sensitive paper. For overcoming the drawbacks described above, it has been proposed to provide various wear resistive coatings on the surface of the heat generator elements. If a substantial thickness of wear resistive coating is provided on the heat generator elements, the thermal resistance which would be created between the heat generator elements and the heat sensitive paper makes the heat dissipation of the thermal printer head difficult, so that there has not yet been any success in making the printing ability compatible with the life of the printing head.

This invention has as its object to solve the problem as described above by providing a thermal printer head having a long life, in which the thermal response is excellent and at the same time wear of the head due to friction against the heat sensitive paper is kept to a minimum.

The thermal printer head according to this invention will now be described further in detail with reference to the accompanying drawings, wherein an embodiment thereof is illustrated, and in which FIG. 1 through FIG. 4 are illustrative representations of the steps in the construction of the thermal printer head according to this invention, FIG. 5 is a side view of the printer head in operation with a portion in section, FIG. 6 is a perspective view of the arrangement of FIG. 5, FIG. 7 is a perspective view of another embodiment of this invention.

FIG. 8 is a plan view of FIG. 4,

FIG. 9 is a side view thereof,

FIG. 10 is an enlarged sectional view along the line A—A in FIG. 7,

Figure 11:
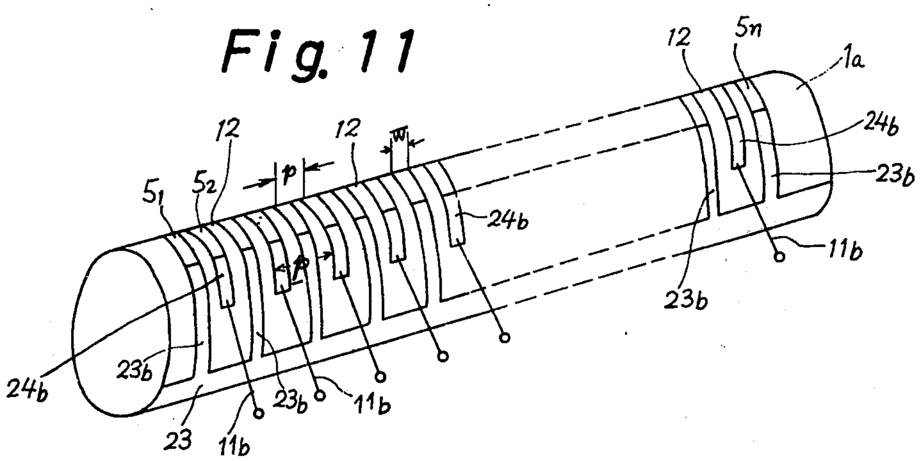
FIG. 11 is a perspective view of another embodiment of this invention.
Figure 13:
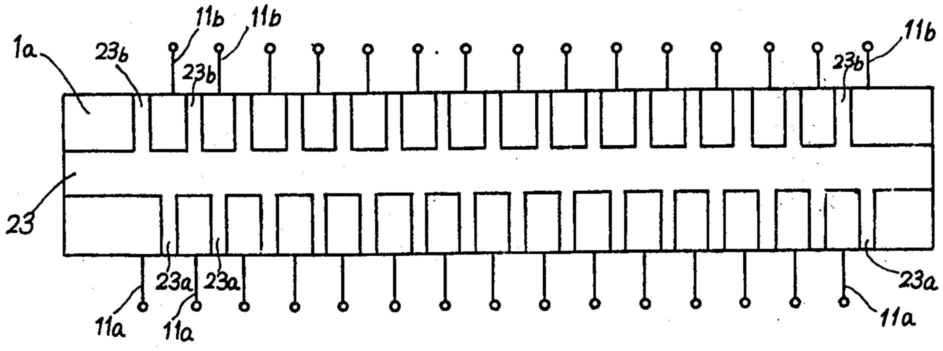
Figure 12:
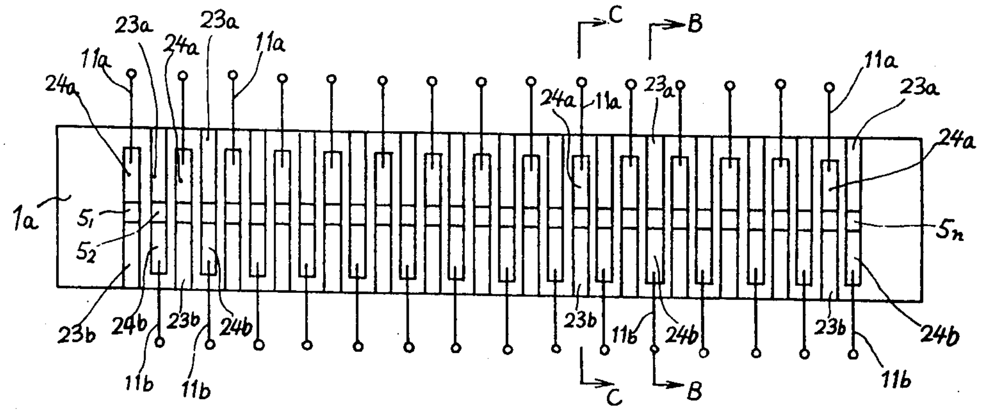
Figure 14:
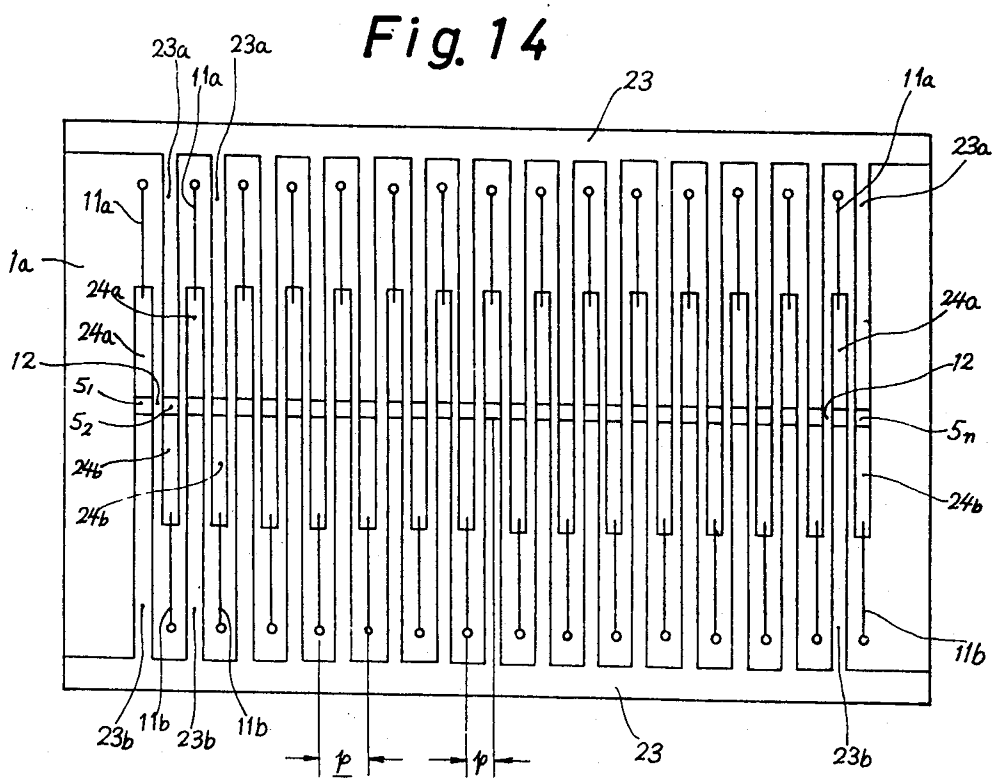
Figure 15:
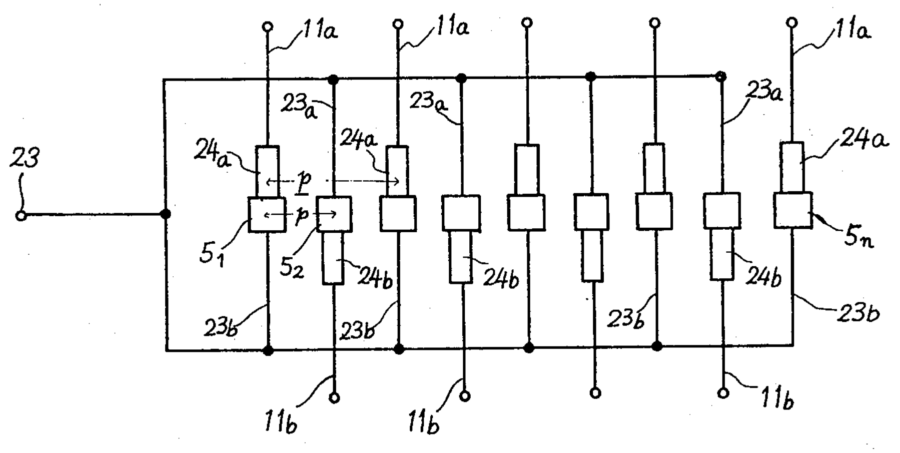
Figure 16:
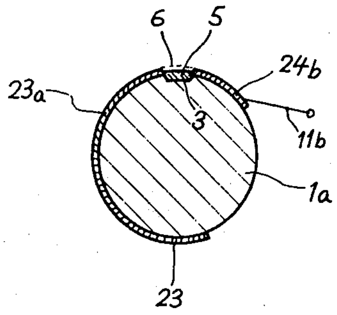
Figure 17:
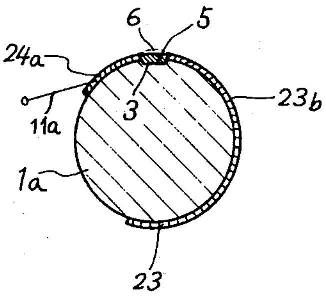
Figure 18:
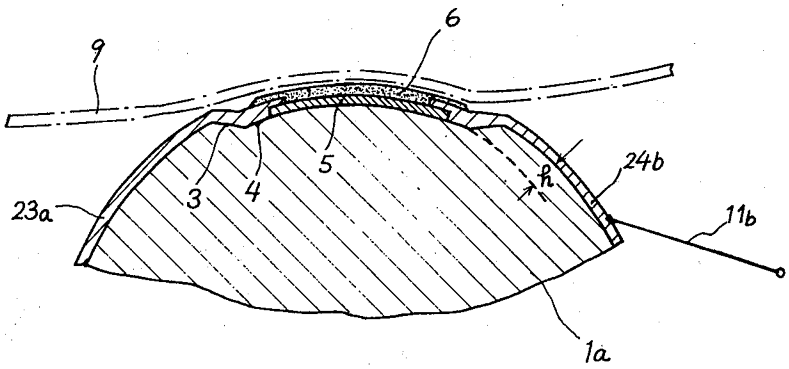

FIGS. 12 and 13 are a plan view and a bottom view, respectively, of the embodiment according to FIG. 11, FIG. 14 is a developed diagram of the peripheral surface of the body of FIG. 11, FIG. 15 is a developed diagram of the electrical circuit for the embodiment according to FIG. 11, FIGS. 16 and 17 are sectional views along the lines B—B and C—C of FIG. 12, respectively, and FIG. 18 is an enlarged sectional representation of a portion of FIG. 16.

Figure 1:
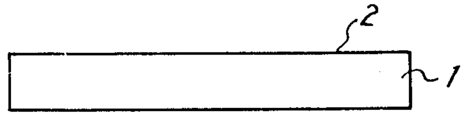
Figure 2:
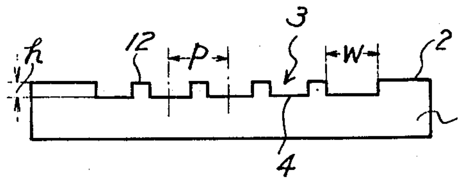

The insulation base plate 1 of a ceramic material, the cross sectional form of which is as shown in FIG. 1, is machined at the upper surface 2 to provide a plurality of recesses 3 as shown in FIG. 2. The recesses preferably have dimensions of 10 – 5u in depth, 0.1 – 0.3 mm in width, and are spearated by 0.3 – 0.5 mm, and they may conveniently be machined or be prepared by a photo-etching process.

Figure 3:
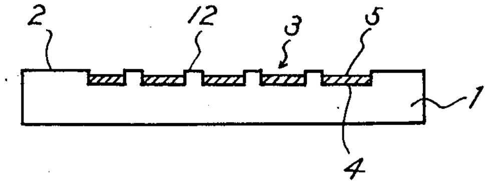
Figure 4:
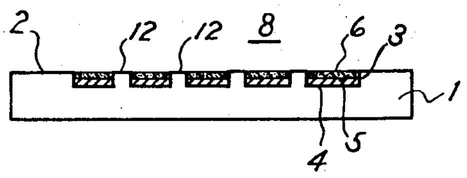

Heat generator elements 5, for example, resistor film of nichrome, are disposed in the bottoms 4 of the recesses 3 and then wear resistive protector films 6 consisting of SiC, $SiO_2$ or the like, are provided over said elements 5 to fill up said recesses as may be seen in FIGS. 3 and 4. Terminal electrodes 7*a*, 7*b*, see in FIG. 8 are secured to the both ends of said heat generator elements 5 to complete a thermal printer head 8 according to this invention as seen in FIG. 4.

FIG. 8 is a plan view of FIG. 4, and FIG. 9 is a side view thereof, wherein can be seen lead wires 11*a* and 11*b* for the electrode terminals 7*a* and 7*b*, respectively, the ends of said lead wires being provided with connecting terminals 13*a* and 13*b*, respectively. Disposed on the heat generator elements 5 of the thermal printer head is a press roller 14, which is adapted to press the heat sensitive paper 9 against the heat generator elements 5, the rotation of said roller cuasing the heat sensitive paper to be shifted forwards in the direction of the arrow.

Figure 6:
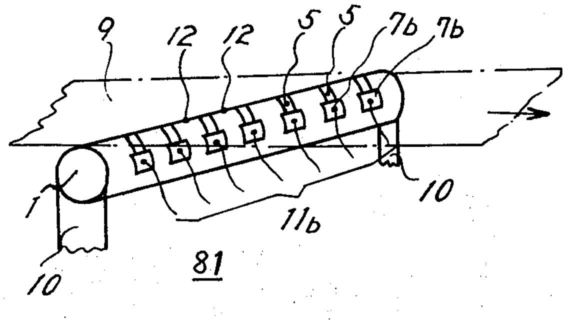
Figure 5:
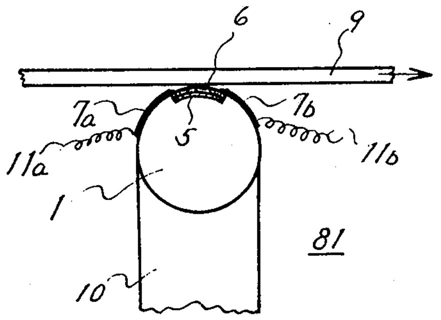

An embodiment of thermal printer head 8*l* in a cylindrical configuration supported by a pair of supporter plates 10 as seen in FIGS. 5 and 6 can be conveniently used since the terminal electrodes 7*a*, 7*b* are kept from contacting the heat sensitive paper 9, which is transferred contiguous to the upper surface of the heat generator elements 5. Lead wires 11*a* and 11*b* are provided to said terminal electrodes 7*a* and 7*b*.

As may be seen from the above description, the thermal printer head according to this invention, wherein the wear which may be assumed to arise from the friction of the heat sensitive paper being transferred while in contact with the upper surface of the thermal printer head is adequatly protected against by the upper surface of the base plate 1 in the area 12 which is hard to be wear resistant, except for the section, where the recesses are provided, and the protector film 6 can be comparatively thin, and accordingly, the thermal printer head according to this invention has an excellent thermal response and in a much longer life as compared with the conventional ones.

Figure 7:
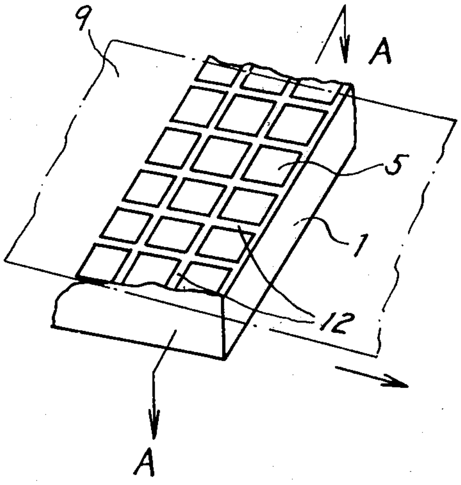

The printer head as shown in FIG. 7, wherein the heat generator elements 5 of the construction as seen in FIG. 5 are embedded in a form of a matrix, can also have functions and effectiveness quite the same as those stated above.

Further, FIG. 10 is an enlarged sectional view taken along the line A—A in FIG. 7, and shows electrodes 15 and 16 provided on both ends of the heat generator element 5, and conductors 16 and 17 extending from said electrodes through said insulator base plate 1 to the bottom surface thereof, the lower ends of said conductors being provided with terminals 19 and 20 for attacking lead wires 21 and 22, respectively, thereto.

Further embodiments as seen in FIG. 11 through FIG. 18 are thermal printer heads applicable for the line-dot system of thermal printing.

The so-called line-dot type of thermal printer head, wherein a plurality of minute heat generator elements are arranged in a row, has previously been utilized in displaying characters, figures or the like for the output printer of a mini-computor, a facsimile receiver, etc., a much higher dot-density of the heat generator elements is desirable for the improvement of the printing quality thereof. At present a density of 3 to 4 dots per mm is throught to be standard, but a more minute resistive heat generator is desirable which permits a density, of 5 to 6 dots per mm, the pitch *p* of dots arranged in a line at such a density being 0.2 to 0.16 mm. In creating such a high density of heat generation on the thermal printer head, not only there is required a better technique for constituting such minute resistive heat generator elements, but the problem must also be solved as to how to connect the electrode terminals 7*a* and 7*b* for the external lead wires with the minute heat generator elements which have been arranged at such a tiny pitch as described above, the spaces around the electrode terminals being very narrow, because technical difficulty is inevitable if the electode terminals 7*a* and 7*b* are provided for both sides of the heat generator elements according to prior art techniques for connecting lead wires 11*a* and 11*b* as illustrated in FIG. 5 or 6 (on the left and right sides of the heat generator elements in FIG. 5, and on the upper and lower sides thereof in FIG. 11 through FIG. 15).

The problem may adequately be solved by means of a feature of this invention, wherein, as shown in FIG. 11 through FIG. 18, there is utilized a cylindrical base body l*a*, on the peripheral surface of which are provided heat generator elements 5 arranged in a straight line and conductive films 23*a* which are connected to one side of alternate heat generator elements $5_1$, $5_3$, $5_5$ . . . and films 23*b* which are connected to the other sides of the remaining heat generators $5_2$, $5_4$, $5_6$ . . . . The films 23*a* and 23*b* are led in opposite directions from the upper part to the bottom part of the cylindrical base body l*a* along the peripheral surface thereof and are joined to common electrode terminal 23 at the bottom thereof, an internal connection system being built with said conductor films 23*a* and 23*b* and with the common electrode terminal 23.

Short films 24*a* and 24*b* are connected to the other sides of heat generator elements 5 to serve as electrode terminals for connecting lead wires 11*a* and 11i b. These terminals alternate with films 23*a* and 23*b* on both sides of the adjacent heat generator elements. That is to say, the heat generator element $5_1$ is provided with an electrode terminal 24*a* at the upper end thereof in FIG. 14 and with a conductive film 23*b* at the lower end thereof, and the heat generator element $5_2$ is provided with a conductive film 23*a* at the upper end thereof and with an electrode terminal 24*b* at the lower end thereof; thus these electrode terminals and conductive films are alternately disposed with respect to each adjacent heat generator element. Accordingly, the pitch *p* of respective electrode terminals 24*a* and 24*b* is twice the pitch *p* of the heat generator elements in the arrangement. That is to say, electrode terminals 24*a* and 24*b* may be arranged with a pitch, which is twice that of electrode terminals 7*a*, 7*a* . . . and 7*b* . . . in the prior art arrangement thereof as seen in FIG. 5 and FIG. 6, wherein said electrode terminals 7*a*, 7*b* for connecting lead wires are provided on sides of the heat generator elements (in FIG. 5 they are arranged on the left and right side of the heat generator elements), so that a great advantage is attained in that a soldering or welding process can be performed much more conveniently for connecting lead wires to the electrode terminals 24*a* and 24*b*, and the lead wires 11*a* and 11*b* may easily be led to the external circuit.

Thus, by applying a voltage upon the desired ones of the electrode terminals 24*a*, 24*b* and to the common terminal 23, any desired heat generator element can be heated to make it to function as a thermal printing head.

Accordingly, the above described thermal printer head, which is particularly effective when used as a high density line-dot type or thermal printer head, has an excellent thermal response and a much longer life than those of the prior art because the abrasion thereof of due to the friction between the printer head and the heat sensitive paper 9 shifting while in pressured contact therewith is protected by the portion 12 on the peripheral surface of the base body 1*a*, where no recess is machined (this portion being of hard material with high resistance against abrasion), and the protector film 6 over the heat generator element 5 can be made relatively very thin. Furthermore, if the base body 1*a* is shaped as a cylinder, the conductive films 23*a*, 23*b* provided along the peripheral surface thereof, as well as the common terminal 23 extending along the bottom surface, and the electrode terminals 24*a*, 24*b* may conveniently be prepared by vacuum evaporation of conductive metal, and they are well protected from contact with the heat sensitive paper 9 which is shifted while in contact with the upper surface of the heat generator elements 5.

As described above, the thermal printer head according to this invention has an excellent heat responsive characteristic and a longer life due to the resistivity against abrasion, it is suitable for a higher density line-dot type of thermal printer head, because an ample pitch is provided in the arrangement of electrode terminals for taking out the lead wires from the heat generator elements, and it may be employed in many fields of application, as a fascimile received or an output printer for mini-computors, and has a low production cost.

What is claimed is:

1. A thermal printer head for printing on heat sensitive paper under the condition in which there is relative motion between the printer head and the paper, said printer head comprising a cylindrical insulator base having a plurality of shallow linear recesses in the cylindrical surface thereof along a single line parallel to the cylinder axis, heat generator film resistors within said recesses and filling said recesses to a level just below the surface of the base surrounding the recesses, the areas of the surface of the base between said recesses contacting the heat sensitive paper during a printing operation and frictional contact occurring only between the base and the paper, and the heat generator film resistors being protected from abrasion due to friction between the resistors and the paper, said heat generator film resistors having first film conductor terminals extending therefrom around said cylindrical insulator base, the first film conductor terminals from alternate heater elements extending in opposite directions around the cylindrical insulator base, and said heat generator film resistors having second lead wire terminals extending therefrom around the cylindrical insulator base in the opposite directions from the first film conductor terminals in the spaces on the surface of the cylindrical insulator base between the first film conductor terminals and for a distance less than the length of said first terminals, whereby the arrangement of the heat generator film resistors is compact due to the fact that the pitch therebetween is half the pitch between adjacent first film conductor terminals and adjacent second lead wire terminals and the printer head is suitable for a line-dot type printer head.

2. A thermal printer head as claimed in claim 1 wherein wear resistive films are provided in said recesses over said heat generator film resistors and filling said recesses.

3. A thermal printer head as claimed in claim 1 in which said cylindrical insulator base has a common film conductor terminal on the side of said cylindrical insulator base substantially diametrically opposite said recesses to which said first film conductor terminals are electrically coupled.

* * * * *